(No Model.)  J. A. HOUSE.  5 Sheets—Sheet 1.
CHECK PUNCH.

No. 435,063.  Patented Aug. 26, 1890.

Witnesses
Wm. J. Tanner
A. J. Tanner

Inventor
James A. House
by his attorney
J. H. Hubbard

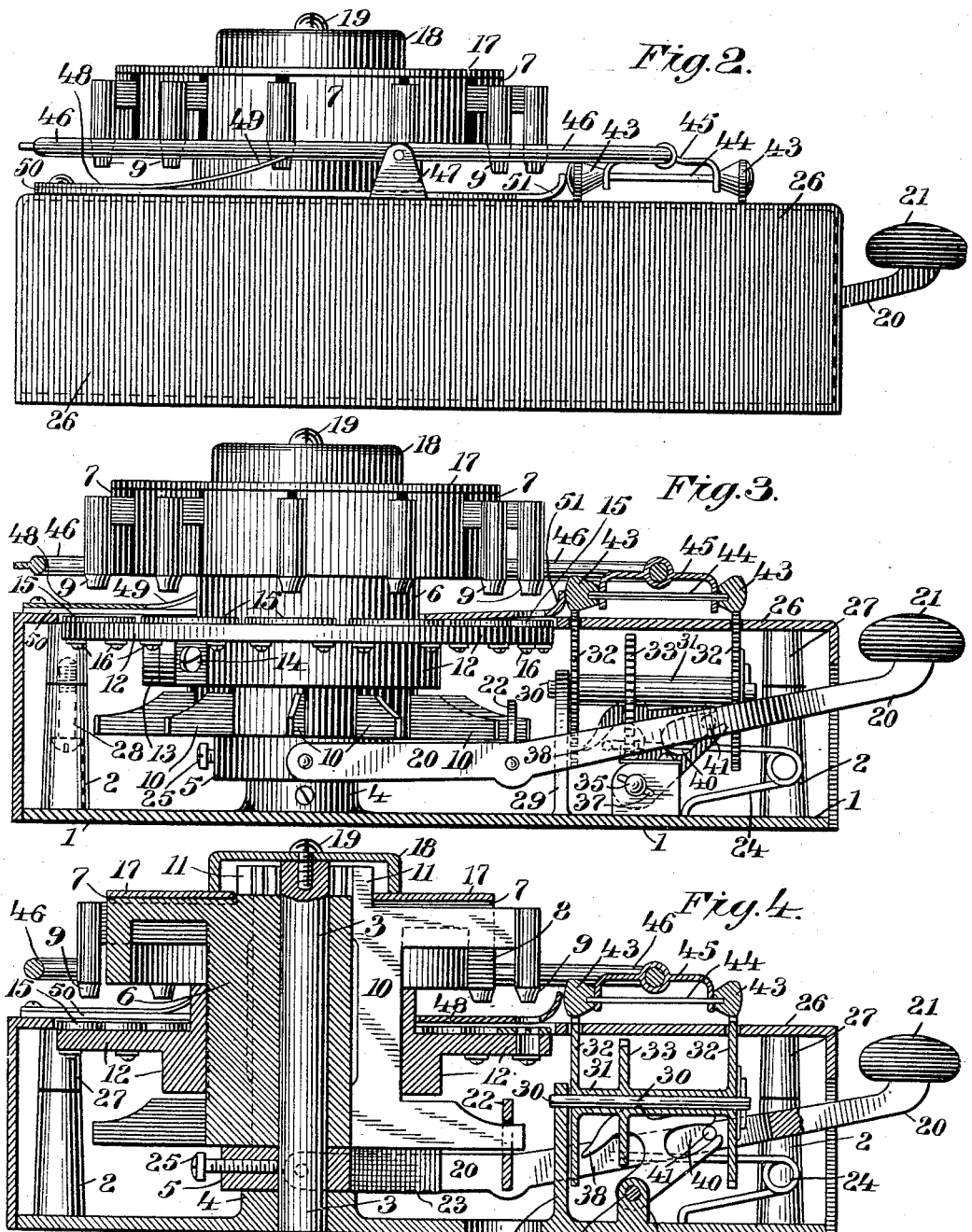

(No Model.)  5 Sheets—Sheet 3.

J. A. HOUSE.
CHECK PUNCH.

No. 435,063. Patented Aug. 26, 1890.

Witnesses
Ebn J. Tanner
A. J. Tanner

Inventor
James A. House
by his attorney
J. H. Hubbard.

(No Model.)　　　　　　　　　　　　　5 Sheets—Sheet 4.
J. A. HOUSE.
CHECK PUNCH.
No. 435,063.　　　　　　　　Patented Aug. 26, 1890.
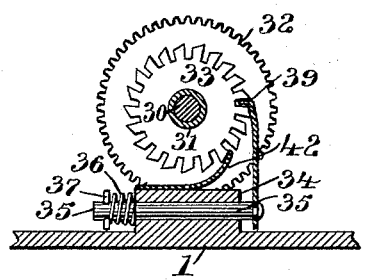
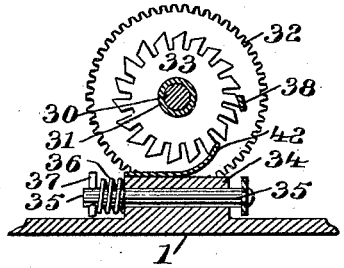
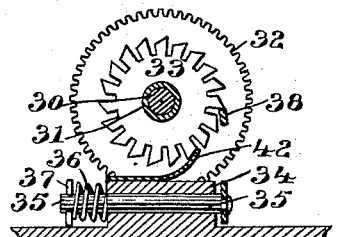
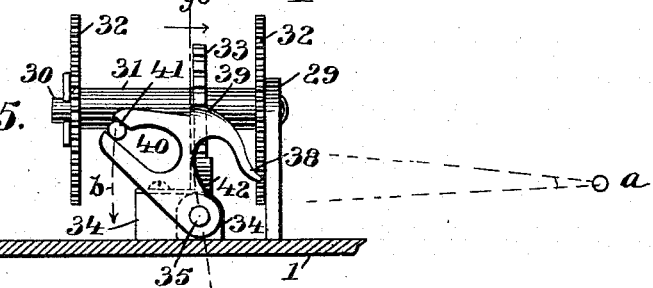
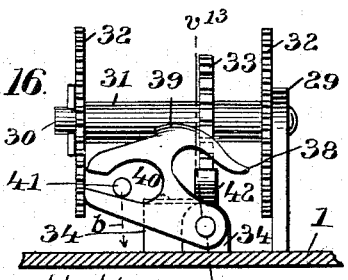
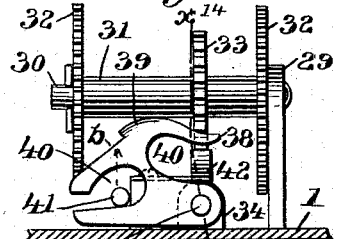
Witnesses
Wm J Tanner
A. J. Tanner
Inventor
James A. House
by his attorney
D. H. Hubbard

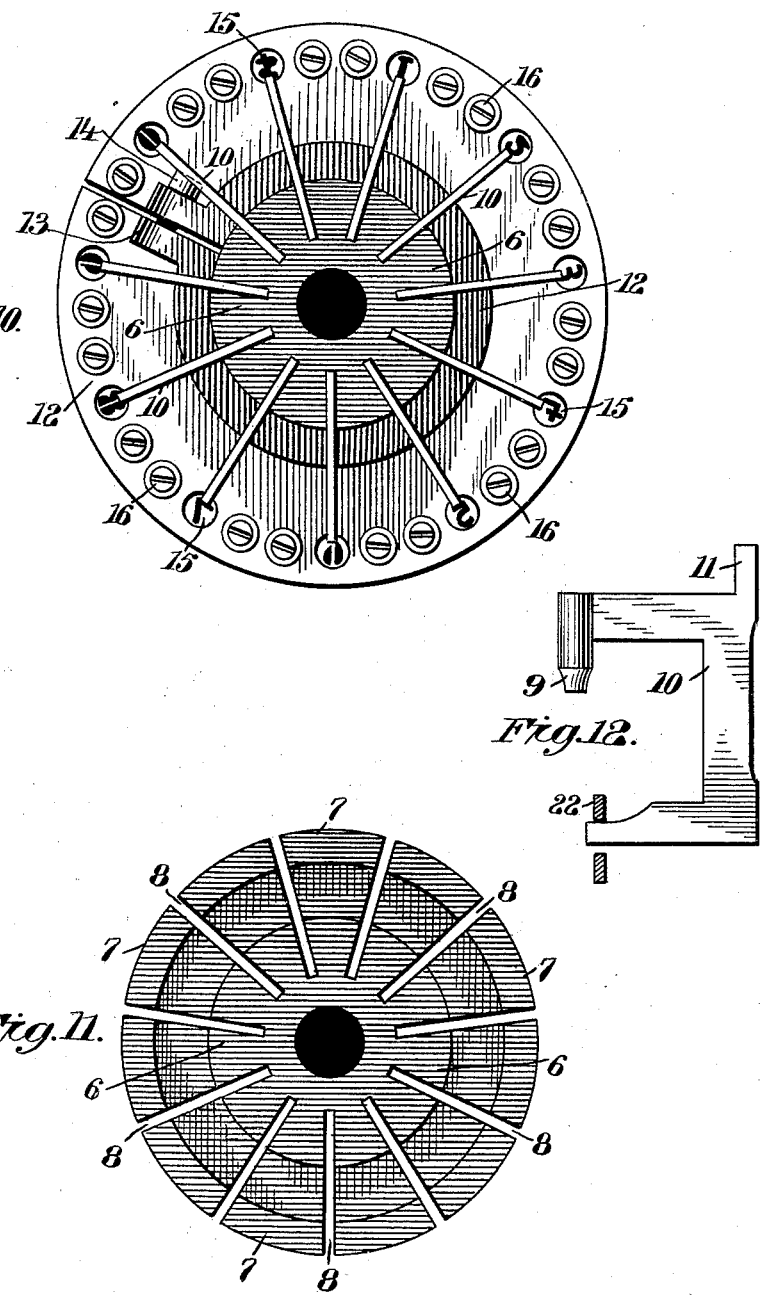

UNITED STATES PATENT OFFICE.

JAMES ALFORD HOUSE, OF BRIDGEPORT, CONNECTICUT.

CHECK-PUNCH.

SPECIFICATION forming part of Letters Patent No. 435,063, dated August 26, 1890.

Application filed April 7, 1890. Serial No. 346,847. (No model.)

*To all whom it may concern:*

Be it known that I, JAMES ALFORD HOUSE, a citizen of the United States, residing at Bridgeport, in the county of Fairfield and State of Connecticut, have invented certain new and useful Improvements in Check-Punches; and I do hereby declare the following to be a full, clear, and exact description of the invention, such as will enable others skilled in the art to which it appertains to make and use the same.

My invention relates to certain new and useful improvements in check-punches, and has for its object to provide a machine of this description which shall be simple in its construction and operation and inexpensive to manufacture; and with these ends in view my invention consists, first, in a novel form of punch and in suitable mechanism for operating the same; second, in mechanism for holding and feeding the check, whereby the latter may be held for presentation to the cutting mechanism and may be automatically and positively carried forward one step after each operation for the proper spacing of the punched characters; third, in the construction of the rotary head, the combination of the dies with said head, and the arrangement of the punches in said head; fourth, in the upper feeding-wheels and the means whereby they are caused to co-operate properly with the positively-actuated lower wheels, and, fifth, my invention, in addition to the features above specifically noted, resides in the general mechanical construction and the several combinations of co-operating parts, as hereinafter will be fully and in detail set forth, and particularly recited in the claims.

In order that those skilled in the art to which my invention appertains may fully understand its construction and operation, I will describe the same in detail, reference being had to the accompanying drawings, which form a part of this specification, and in which—

Figure 1:
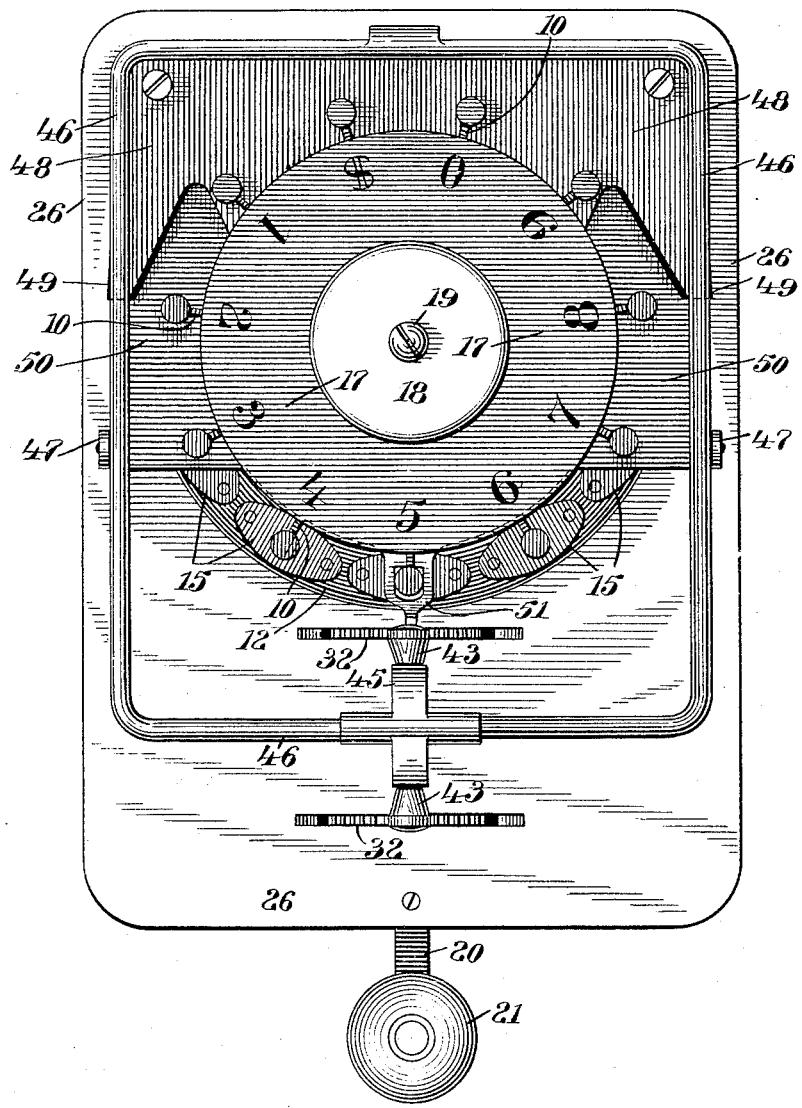
Figure 5:
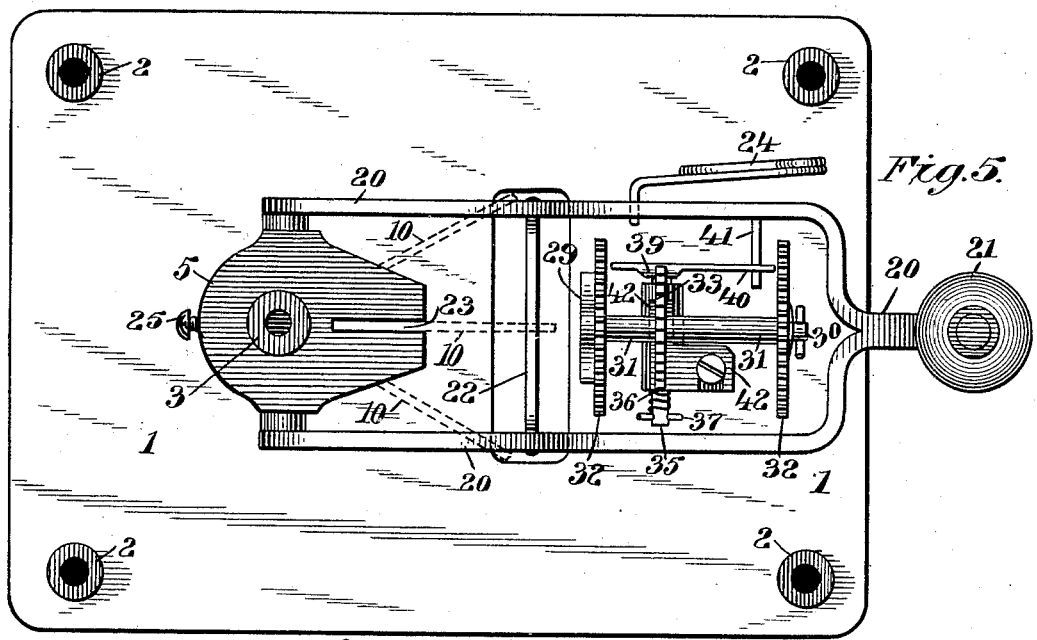
Figure 6:
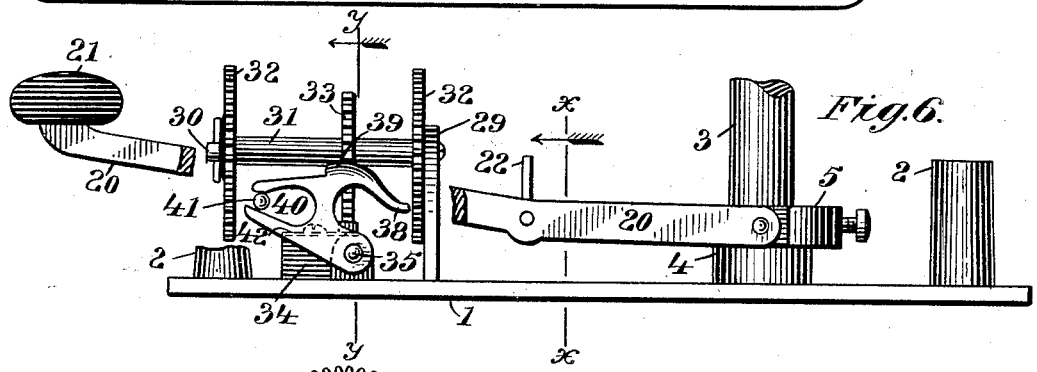
Figure 7:
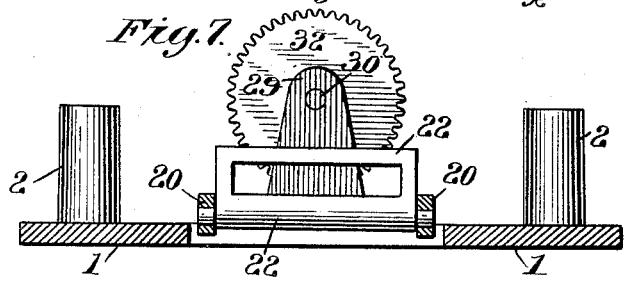
Figure 9:
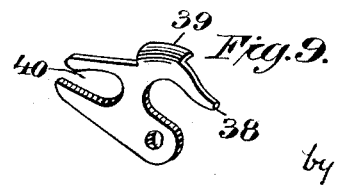

Figure 1 is a plan view of my machine; Fig. 2, a side elevation; Fig. 3, a side elevation, the case being removed; Fig. 4, a central vertical section, certain parts being shown in elevation; Fig. 5, a plan view, the case and the head and parts carried thereby being removed; Fig. 6, a detail elevation from the side opposite that shown at Fig. 3, the operating-lever being broken away; Fig. 7, a detail sectional elevation at the line $x\,x$ of Fig. 6, looking in the direction of the arrow; Fig. 8, a detail sectional elevation at the line $y\,y$ of Fig. 6, the operating-lever being omitted. This figure is also upon the dotted line $y^8$ of Fig. 15. Fig. 9 is a detail perspective of the feed-operating dog; Fig. 10, a detail bottom plan view of the head, showing the die-ring and the punch-shanks; Fig. 11, a detail bottom plan view of the head-casting; Fig. 12, a detail side elevation of one of the punches; Fig. 13, a detail section at the line $v^{13}$ of Fig. 16; Fig. 14, a section taken at the line $x^{14}$ of Fig. 17. Fig. 15 is a detail side elevation showing the dog in its locked position; Fig. 16, a similar view showing the dog as having commenced its backward movement; and Fig. 17, a similar view showing said dog as having completed its backward and downward movement.

The small circle $a$ and the dotted lines therefrom proceeding indicate the fulcrum-point and the limit of movement of the lever which carries pin 41 and operates the dog.

The dotted arrows $b$ on Figs. 15, 16, and 17 denote the movement either in process or next to be made by the dog.

In all the figures of the drawings like numerals denote the same parts.

The foundation of the machine is preferably a rectangular base or bed plate 1, having at its corners tubular columns 2, by means of which, as will be hereinafter explained, the inclosing-case is secured in assembled position.

3 is a post projecting vertically from the base.

At the bottom of the post is a hub 4, designed to support a block 5 out of contact with the base. The function of this block will presently appear.

The punch-carrying head consists of a casting whose body portion 6 is cylindric and of uniform diameter and an outwardly-projecting flange 7 at the upper end of the body-portion, the whole being generally T-shaped in vertical section, as is partially shown at Fig. 4. The head is axially bored for the accommodation of the post 3, on which said head is journaled, and may be freely turned, the bottom end thereof resting upon the upper surface of the block 5, heretofore referred to. As seen at the detail, Fig. 11, both portions of the head have radial slots 8 cut therein for the purpose of accommodating a series of punches, whose cutting portions 9 project beyond the periphery of the flanged head, but whose L-shaped shanks 10 have their bearings in the slots and project outward below the punches, as is seen at Fig. 4. Each punch-shank has a guiding projection 11 at its upper end, for the purpose of preventing any accidental forward movement of the punch or shank in the slotted head and for insuring to said punch an accurate vertical movement when depressed.

12 is an annular platform or ring open at one side, as seen at Fig. 10, and provided with pierced and screw-threaded ears 13 and a screw 14, whereby said ring may be tightly secured around the cylindric portion of the head, to which it is closely adapted. Near its outer edge this ring is pierced, and over each opening is secured a die-plate 15, having cut therein a die corresponding to one of the punches. I have shown these die-plates as secured in position by means of screws 16 entering them through the ring from beneath; but the means of fastening is immaterial, so that each die is properly positioned to receive the cutting-face of the appropriate punch.

In assembling the head, ring, and punches, the ring, with its fastening-screw removed, is slipped over the lower end of the head to about the position shown at Fig. 4. The opening in the ring is then brought into coincidence with one of the slots in the head and a punch backed inward into its position, as shown at Fig. 3. The head is then turned one space to bring the next slot into alignment with the opening in the ring for the insertion of the next punch, and this operation is repeated until the slots are filled. This assembling operation may be done either before or after the die-plates are placed in position. When the head is filled and the dies and punches aligned, the ring is tightened about the head by means of its screw, so that the parts may not be accidentally displaced. An index-plate 17, having numbers and characters corresponding to the several punches, is secured upon the top of the head, the central opening of said index-plate being of such size as to afford the guiding projections 11 a bearing against its edge for the purpose hereinbefore set forth. (See Fig. 4.) The guiding projections are inclosed from view by a drawn-metal cap 18, which by means of a screw 19 is secured to the post. Said cap also prevents the head and its contained and attached parts from being withdrawn upward from its assembled position about the post, while permitting thereto free rotation about said post as an axis.

The vertical movements necessary to be made by the punches in order to pierce the paper and return are effected by means of a lever 20, which, immediately behind the handle 21, divides and has its two branches fulcrumed upon either side of the block 5, heretofore referred to. (See Fig. 5.) Between the branches of the lever is secured a bar 22, having its center cut away longitudinally, as is shown at Fig. 7. This bar is so placed that when the head is rotated the ends of the outward extensions of the punch-shanks will enter and pass through the slot therein. The parts are so arranged, however, that when the punch-shank is at the center of the opening the adjacent shanks upon either side are clear of the bar. This is shown in elevation at Fig. 3 and in dotted lines at Fig. 5. When at the center of the bar the punch-shank is directly over a longitudinal slot 23, cut in the block 5, and by means of the lever said shank may be carried downward into said slot, whereby the downward cutting movement of the punch into its die is effected. A spring—such, for instance, as 24—engaging the base and the lever, effects the upward movement of the latter, and thereby carries the punch upward out of the slot to its normal position. Of course it will be readily understood that no downward movement of any punch can be effected except said punch be in line with the slot in the block 5. The block 5 is secured as against rotation about the post by means of a set-screw 25. The upward limit to which the lever may be raised by its spring may be fixed by any suitable stop or by the engagement of the cross-bar with the punch-shanks.

26 is an inclosing-case having an opening in its top, through which the punch-head and punches project, said opening being substantially adapted to the outline of the die-ring, as is seen at Figs. 1 and 4. Said cap has depending from its inner wall hubs 27, into which screws 28 project and engage from the tubular columns on the base. One of these screws is shown in dotted lines at the left of Fig. 3.

The feeding mechanism whereby the check or other paper to be punched is advanced between and relative to the dies consists of two co-operating mechanisms, one located upon the bed-plate contiguous to and actuated by the movement of the operating-lever and the other arranged upon the top of the inclosing-case.

The first of these is as follows: Between the arms of the operating-lever a standard 29 projects upward from the bed-plate. A shaft 30 extends rearwardly at right angles to this standard, and upon this shaft is journaled a sleeve 31, carrying two serrated feeding-wheels 32 and a ratchet-wheel 33, the shape of whose teeth is clearly shown at Fig. 8. Below the ratchet-wheel a lug 34 is formed upon the bed, through which extends a short shaft 35, capable both of axial and endwise movement in its bearings. A small spring 36, interposed between the lug and a pin 37 on the shaft, tends to retain the shaft in the position shown at Fig. 8. Secured upon the end of this shaft is a dog whose function is to engage and operate the ratchet-wheel 33. Said dog has a forwardly-projecting beak 38 and laterally-projecting flange 39. At the rear of said beak, behind the flange, the body of the dog is forked, as seen at 40 in the detail, Fig. 9. A horizontally-extended pin 41, secured to the lever, projects through this fork and serves to operate the dog and the short shaft about the axis of the latter. The normal position of the dog is that shown at Figs. 6 and 8, with its lateral flange engaging between two of the teeth on the ratchet, whereby the latter and the feed-wheels operated thereby are held as against any movement. While this lateral flange is within the space between two teeth and is adapted to resist axial movement of the ratchet-wheel in either direction, the inner extremity of the flange does not rest against the bottom of the notch; but, on the other hand, the side of said dog rests against the end of the tooth above which the flange engages. When the operating-lever is depressed to effect the punching operation, the dog swings downward and backward, and the locking-flange passes from between the teeth wherewith it has been engaged. As the dog is carried farther downward and rearward that portion of the beak which is in front of the locking-flange abuts against the beveled end of the tooth above which the locking-flange was engaged and slides over the point of said tooth until, by reason of the shorter distance between the shaft 35 and the end of the beak and said shaft and the locking-flange, the beak slips from the end of the tooth, and the dog and shaft 35 are then drawn slightly inward by the spring 36, whereby the beak rests against the tooth below that over which the locking-flange had previously rested. As seen at Fig. 8, as the flange passes from between the two teeth where it is shown as engaged, the beak slides over the point of the tooth beneath the flange, and the spring draws it inward against the face of the next tooth. The exact position and movement of the dog in effecting its feeding operation may be readily understood by reference to Sheet 5 of the drawings by comparison of Figs. 8, 15, 13, 16, 14, 17. At this time the lever has reached its lowest point. The upward returning movement of the lever, which is effected by its spring, causes the curved upper edge of the beak to raise the tooth with which the spring has engaged it and turn the ratchet-wheel and the feeding-wheels a fraction of a revolution, when the flange on the dog will enter between the teeth and lock the ratchet-wheel until the next operation of the lever. By reference to Figs. 14 and 17 the engagement of the beak with the ratchet-wheel tooth, which enables the dog to turn the wheel, is thought to be clear. A small friction-spring 42 is mounted upon the lug and engages the teeth of the ratchet-wheel for the purpose of detaining the latter as against too free movement when the locking-flange is disengaged.

The complementary feeding mechanism consists of a pair of small feed-wheels 43, secured upon a short shaft 44 above the top of the case, the peripheries of said wheels being adapted to engage with the roughened peripheries of the lower feed-wheels, which project upward through slots in the case, as seen at Figs. 3 and 4. The short shaft which bears the upper feed-wheels just referred to has its bearings in a sheet-metal evener 45, journaled upon a rectangular frame 46, said frame being pivoted at its sides between lugs 47 on the case. A plate 48, having upwardly-projecting spring-fingers 49, is secured at the rear of the case, and the fingers engage and press upwardly upon the frame at the rear of its journals, thereby causing the feed-wheels to be normally engaged with the upwardly-projecting peripheries of the lower wheels. The pivotal connection between the evener and the frame causes the engagement of the wheels to be constant and equal in pressure.

50 is another plate secured beneath the plate 48, just described. At its forward end it carries an open-stripper 51, whose extremity is slightly upturned. The open portion of the stripper is directly in the line of descent of the punch, and said stripper serves to clear the punch as the latter ascends.

In the operation of my invention the check to be punched is first introduced on top of the casing between the punches and dies and beneath the stripper, the upper feed-wheels being raised out of engagement with the lower feed-wheels by raising the forward part of the frame upon its pivots against the action of the spring-fingers. When the frame is released, the check will be grasped and held between the two pairs of wheels. The head and punches are then turned by means of the hand until the punch representing the first character to be cut is directly over the opening in the stripper, at which time, as has been hereinbefore explained, the shank of the selected punch will be directly over the slot in the block 5 and the outwardly-projecting portion of the shank engaged with the center of the opening in the bar carried by the operating-lever. The punch may then be freely depressed, so as to enter the die and punch out the character from the paper. The downward movement of the lever has drawn back the dog, so as to engage a new tooth of the ratchet, and the upward return of the lever by its spring not only raises the punch to its normal position, but, through the dog, turns the ratchet one step. This carries the paper forward one space for the next punching operation, the feeding-wheels being locked by the flange on the dog as soon as the feeding movement is completed. The check may be removed at any time by lifting the upper feed-wheels, as above described.

In this my invention I do not wish to be confined to the precise details of construction herein shown and described, since the details of construction thereof may be freely altered and varied without departing from the spirit and aim of my invention, which consists in the combinations of elements claimed in the claims hereof and the fair equivalents thereof.

I claim—

1. In a check-punch, the combination, with a rotative head provided with radial bearings, of a series of cutting-punches each having a shank extending rearwardly and then downwardly within the bearing and then outwardly from said bearing, means for engaging either of the outwardly-projecting shanks, and dies arranged between the shanks and punch-faces and adapted to co-operate with the latter, substantially as set forth.

2. In a check-punch, the combination, with the head, the same having therein suitable bearings, of a series of punches representing characters, shanks adapted to slide in the bearings in the head and secured to said punches and extending below the cutting-faces thereof, and means capable of engagement with either of the punches and of disengagement therefrom, whereby the depression of the selected punch may be effected, substantially as specified.

3. In a punch, the combination, with a suitable rotary head, of a series of punches having bearings in said head and projecting radially therefrom, shanks secured to said punches and extending downward through the head to a point below the operative faces of the punches, and a lever adapted to engage the shanks and thereby operate said punches, substantially as set forth.

4. In a check-punch, the combination, with the cylindric rotative head, of the punches arranged to slide in said head and having outwardly-projecting shanks, as described, the operating-lever arranged beneath the head and adapted to engage and operate the punches, and a guideway located beneath the head and adapted to admit the shank of the depressed punch.

5. In a check-punch, the combination, with the cylindric head provided with radial slots, of the punches having the rearwardly and downwardly extended shanks seated in said slots and adapted to slide vertically therein and a lever provided with a slotted bar arranged beneath the cutting-faces of the dies, said bar adapted to engage the shanks for the depression of the punches, substantially as specified.

6. In a check-punch, the combination, with suitable dies, of a series of punches, each provided with a cutting-face, and a shank extending rearwardly from said punch and then downwardly and then outwardly to a point beneath the cutting-face thereof, and a pivoted lever having means attached thereto for engaging the outwardly-extended portion of the shank, whereby the downward cutting movement of the punch is effected.

7. In a check-punching machine, the combination, with the cylindric head provided with radial bearings extended inward from its edge, of punches having their shanks seated in said radial bearing, and a split die-bearing ring and means for tightening the same in position, adapted to surround the head, whereby the dies are secured in proper relation to the punches, and whereby the shanks of the latter are retained within their bearings, substantially as described.

8. The combination, in a check-punch, with the rotative head and the punches having downwardly and outwardly projecting shanks guided in said head, of an operating-lever arranged in a plane beneath the punch-faces, a slotted bar carried by said lever and adapted to engage the projecting shanks, and a guide into which a punch-shank may be depressed by the lever when the punch is in its cutting position, substantially as specified.

9. In a machine of the character described, the combination, with the feeding-wheels, of a ratchet-wheel moving with said feeding-wheels, a swinging-dog provided with a sidewise-locking flange adapted to enter the plane of the ratchet-teeth, means for normally impelling said dog sidewise toward the ratchet-wheel, and means, as described, for imparting a swinging movement to said dog.

10. In a check-punch, the combination, with the punching devices and the lever for operating the same, of a pair of feeding-wheels, means connected to said lever for operating said wheels step by step, a pair of co-operating feeding-wheels, and a pivotally-hung evener wherein said last-named wheels are journaled, substantially as set forth.

11. In a check-punch, the combination, with the cutting devices, of a pair of lower feeding wheels and means for imparting step-by-step rotation thereto, of a movable pressure-frame arranged above the feeding-wheels and a pair of co-operating feeding-wheels whose axis is pivotally attached to the frame and adapted to move relative thereto, substantially as specified.

12. In a check-punch, the combination, with the base and the operating-lever, of the feed-wheels and ratchet-wheel adapted to rotate together, the operating-pawl having both a swinging movement on its pivotal point and a sidewise-sliding movement toward and away from the ratchet-wheel, means secured on said pawl for locking the ratchet, and an operative connection between said pawl and the operating-lever, substantially as specified.

13. In a check-punch, the combination, with the punching mechanism and the operating-lever, of the two lower feeding-wheels connected to and moving together, the ratchet-wheel secured upon the same axis as said feeding-wheels, the swinging pawl provided with a locking-flange adapted both to actuate and to lock the ratchet-wheel, the connection between said pawl and the lever, and the upper feeding-wheels connected together and journaled in the pivoted evener, substantially as specified.

14. In a machine of the character described, the combination, with the base, of the post and the rotative punch-head provided with punches and dies carried thereby, of the bifurcated operating-lever provided with means for engaging and operating the punches, the feeding mechanism located upon the base between the branches of the operating-lever, the inclosing-case secured to the base, and the spring-actuated frame pivoted on the top of the case and bearing the pivoted co-operating feeding-wheels, substantially as set forth.

15. In a check-punch, the combination, with the punching mechanism, the lower feeding-wheels, means for operating them, and the inclosing-case, of the rectangular frame pivotally secured on top of the case, an evener having a pair of feed-wheels journaled thereto and arranged upon the frame, and springs bearing against said frame, whereby the feed-wheels are normally held in contact, as specified.

16. In a check-punch, the combination, with the head and the punches carried thereby, said punches provided with shanks projecting outwardly in a plane below the punch-faces, of the post around which the head is journaled, the block upon which said head rests and is adapted to turn, said block provided with a guide-slot, and the bifurcated operating-lever pivoted to said block and provided with a slotted bar, whereby the punch-shanks may be engaged and the punches depressed, substantially as specified.

17. The combination, in a check-punch, with the rotative and radially-slotted head, of the punches arranged circumferentially of said head and having shanks projecting backward into the slots in said head, guiding projections secured to the punch-shanks and extending above the plane of the upper face of the head, and the dial-plate having an opening whose edge bears against the outer surfaces of the said projections, substantially as specified.

18. In a machine of the character described, the combination, with the punching mechanism, of the feeding-wheels and ratchet-wheel connected together, a swinging dog provided with a locking-flange and adapted to move at right angles across the periphery of the ratchet-wheel, and the operating-lever connected to said dog and adapted to impart a swinging movement thereto, whereby the ratchet-wheel is both operated and locked, substantially as described.

19. The combination, in a machine of the character described, with the feeding-wheels and the ratchet-wheel moving therewith, of the pivoted dog having the lifting-beak 38 and the laterally-projecting locking-flange 39, an axis at right angles to the axis of the ratchet-wheel adapted to support said dog, and a connection between said dog and the operating-lever, whereby the appropriate swinging movement is imparted to said dog, substantially as described.

20. In a check-punching machine, the combination, with the feeding-wheels and the ratchet-wheel having obliquely-pointed teeth moving with said feeding-wheels, of the swinging feed-dog pivoted at right angles to the axis of the ratchet-wheel and adapted to move toward and away from said ratchet-wheel, and means, as described, for imparting a swinging movement to said dog, substantially as described.

21. In a machine of the character described, the combination, with the ratchet-wheel 33, of the dog adapted to have a swinging movement across the periphery of said ratchet-wheel, and likewise a movement toward and away from said ratchet-wheel at right angles to the axis of the latter, said dog being provided with the beak 38 and the lateral flange 39, substantially as described.

In testimony whereof I affix my signature in presence of two witnesses.

JAMES ALFORD HOUSE.

Witnesses:
S. H. HUBBARD,
M. C. HINCHCLIFFE.